United States Patent [19]

Hoover et al.

[11] Patent Number: 4,885,586

[45] Date of Patent: Dec. 5, 1989

[54] CIRCUIT FOR DETERMINING TRANSMITTER MODULATION CHARACTERISTICS

[75] Inventors: Mervyn C. Hoover; Michael L. Schmitt, both of Ridgecrest, Calif.

[73] Assignee: In the United States of America as Represented by the Secretary of the Navy, Washington, D.C.

[21] Appl. No.: 926,973

[22] Filed: Jul. 17, 1978

[51] Int. Cl.⁴ .............................................. G01S 7/36
[52] U.S. Cl. ...................................... 342/13; 342/351
[58] Field of Search ...................... 343/18 E, 100 ME; 342/13, 192, 351

[56] References Cited

U.S. PATENT DOCUMENTS

| | | |
|---|---|---|
| 3,401,341 | 9/1968 | Kahn . |
| 3,588,701 | 6/1971 | Kahn . |
| 3,599,211 | 8/1971 | Mardon ................................ 342/351 |
| 3,665,507 | 5/1972 | Pell . |
| 3,688,197 | 8/1972 | Kahn . |
| 3,737,905 | 6/1973 | Haroules et al. ..................... 342/351 |
| 3,885,216 | 5/1975 | Kahn . |
| 3,919,645 | 11/1975 | Ohsawa et al. . |
| 3,992,670 | 11/1976 | Gittins et al. . |
| 4,292,638 | 9/1981 | Lazarchik et al. .............. 342/351 X |
| 4,303,921 | 12/1981 | Fitzgerald et al. ................... 342/13 |

*Primary Examiner*—T. Tubbesing
*Attorney, Agent, or Firm*—Sol Sheinbein; Melvin J. Sliwka

[57] ABSTRACT

A radiometer circuit for determining the character of the modulation of a signal received from a radio frequency transmitter. The circuit will determine if the transmission is one of the following classes: continuous wave (CW) frequency modulated CW (FMCW), noise modulated FMCW and noise; or pulse modulated, burt pulse modulated, random pulse modulated, or any pulse modulated noise. A single radio frequency amplifier is used to detect and discriminate between pulsed and CW transmissions.

10 Claims, 1 Drawing Sheet

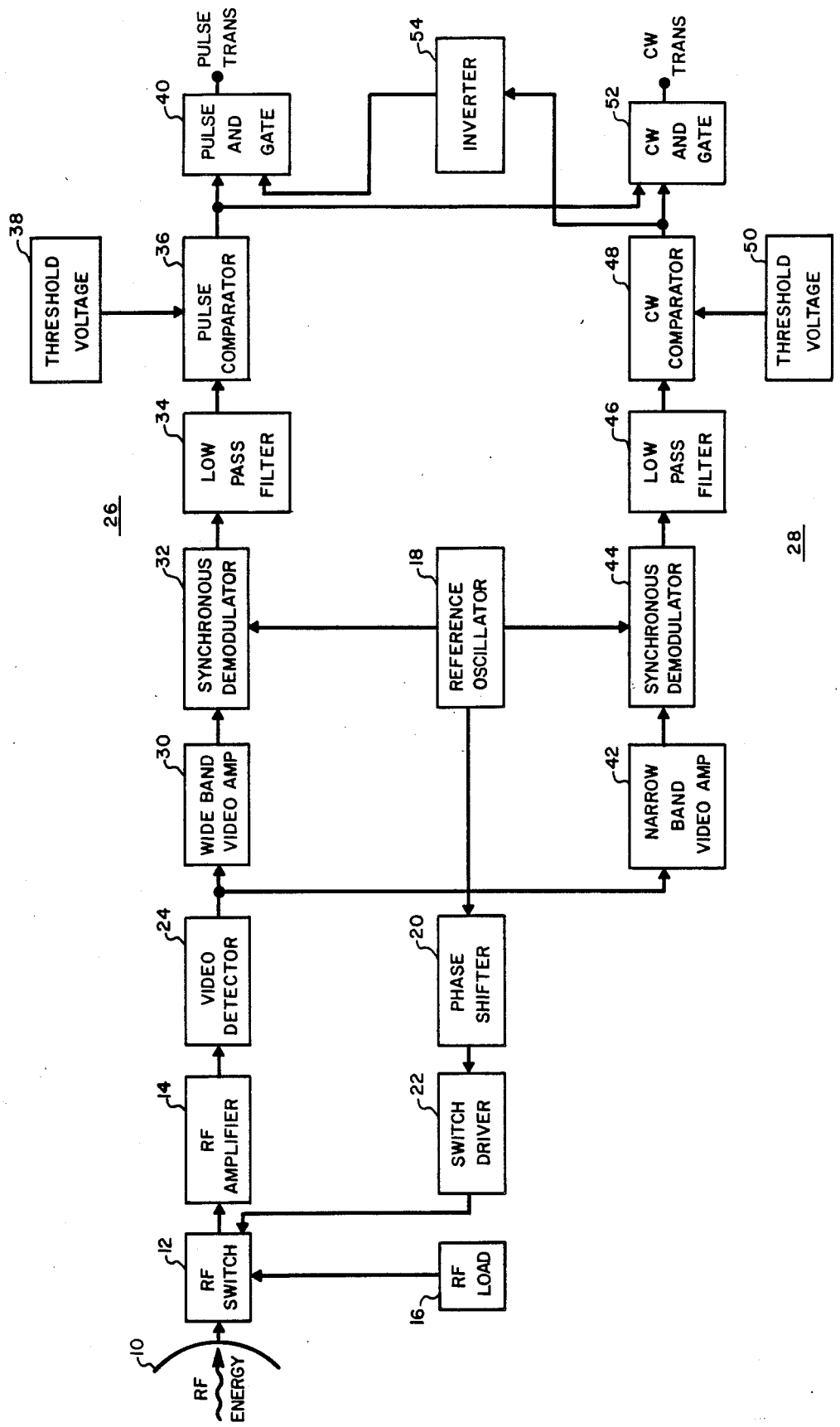

CIRCUIT FOR DETERMINING TRANSMITTER MODULATION CHARACTERISTICS

BACKGROUND OF THE INVENTION

1. Field of the Invention

The present invention is concerned with circuitry which will be used in a system to provide the capability to detect, locate, and analyze target signals (known and unknown). Part of the analysis is involved in determining the character of the modulation of the received signal from a radio frequency transmitter.

2. Description of the Prior Art

In the past, separate receivers have been used to determine the character of the modulation of the received signal from the radio frequency transmissions. However, the receivers also are characterized by low sensitivity and cannot detect low level transmissions.

SUMMARY OF THE INVENTION

A radiometer circuit is used to determine the character of the modulation of a signal received from a radio frequency transmitter. A single radio frequency amplifier can be used to detect and discriminate between pulse and CW transmissions. This is accomplished through the use of RF switching in combination with narrow-band and broad-band video amplifiers and associated demodulators, filters, comparators, and coincident gates for the discrimination of CW and pulse transmissions.

BRIEF DESCRIPTION OF THE DRAWINGS

The FIGURE is a block diagram of the radiometer circuit.

DESCRIPTION OF THE PREFERRED EMBODIMENT

Radiometers are used to detect low level transmissions from a radiating emitter, such as radar, which would appear as a point source or hot spot of several degrees to several thousand degrees Kelvin. In the FIGURE, RF energy is received at an antenna 10 and coupled through an RF switch 12 to the input of an RF amplifier 14. RF switch 12 is also connected to an RF load or reference termination 16.

In addition, another output from a reference oscillator 18 is connected through a phase shifter 20 and switch driver 22 as another input to RF switch 12.

The output of RF amplifier 14 is connected as an input to a video detector 24 which, in turn, has an output which is coupled as one input to a wide-band channel 26 and also as an input to a narrow-band channel 28. Wide-band channel 26 comprises a wide-band video amplifier 30, the output of which is coupled as an input to a synchronous demodulator 32 which has its output connected through a low-pass filter 34 as an input to a pulse comparator 36.

Pulse comparator 36 also receives an input from a threshold voltage level setting circuit 38. Pulse comparator 36 outputs a signal which is coupled as an input to a pulse "and" gate 40, the output of which in turn comprises a signal corresponding to an indication of a pulse transmission being received at antenna 10.

Narrow-band channel 28 in turn incorporates a narrow-band video amplifier 42 the output of which is coupled to a synchronous demodulator 44. The output of demodulator 4 is coupled through a low-pass filter 46 as an input to a CW comparator 48. CW comparator 48 also receives an input from a threshold voltage level setting circuit 50. The output of the CW comparator is coupled as one input to CW "and" gate 52 the output of which in turn comprises a signal indicative of a CW transmission being received at antenna 10.

Another output of CW comparator 48 is coupled as an input to an inverter circuit 54 the output of which provides another input to pulse "and" gate 40. CW "and" gate 52 also receives an input from the output of pulse comparator 36 in the broad-band channel 26.

Both synchronous demodulators 32 and 44 also receive additional inputs from the reference oscillator 18 for a purpose to be explained later.

The present circuit is part of a basic commutative comparison radiometer, first described by R. H. Dickie in "Measurement of Thermal Radiation at Microwave Frequencies, rev. *Sci. Instrum.* vol. 17 (July 1946), pages 268-275 and represents the best known detection method. The method involves a comparison of the antenna temperature with a reference termination by alternately commutating the receiver input from the antenna to the reference termination.

In the present case, a solid state, single-pole double-throw switch 12 is used to switch the input of RF amplifier 14 between the antenna 10 and reference termination or RF load 16 A characteristic of the solid state switch 12 is that it does not present a high voltage standing wave ratio to the antenna, i.e., it must be an absorptive switch instead of a reflective switch. Switch 12 is driven at the reference oscillator 18 frequency by the switch driver 22. Phase shifter 20, which is connected between the reference oscillator 18 and switch driver 22, is used to adjust out any phase lag caused by the switch 12, RF amplifier 14 or video amplifiers 30 and 42 so that the synchronous demodulators 32 and 44 operate in phase.

The modulation imposed on the input signal caused by the switching process shifts the pulse detection signal spectrum up from DC to a carrier numerically equal to the modulation frequency. This procedure eliminates, from the receiver output signal, gain-variation noise whose spectral components are at frequencies lower then the modulation frequency.

RF amplifier 14 is used to raise the level of the input signal and the main requirement of the amplifier is to exhibit a low noise figure and flat gain characteristic over its frequency band. The output of RF amplifier 14 is then detected in video detector 24 which detects the differential energy level present at the output of the RF amplifier. The detector must have extremely good tangential sensitivity and dynamic range.

The video signal resulting at the output of the video detector 24 is split and processed by two parallel channels, one wide-band and one narrow-band. The wide-band channel 26 has a wide-band video amplifier 30 and a wide-band synchronous demodulator 32 to process pulse emitters with pulse widths down to 60 nanoseconds. The wide-band video amplifier 30 is an AC-coupled amplifier with low noise and a gain of approximately 45 db. The synchronous demodulator 32 was designed to handle narrow pulsed signals. Wide-band video amplifier 30 also has a low cut-off frequency about 1 octave below the reference oscillator frequency resulting from reference oscillator 18. The high cut-off frequency is sufficient to pass pulses of a desired duration. The rule of thumb is usually $f_c = (2/t_p)$ where $t_p$ is the pulse duration time and $f_c$ is the upper cut-off frequency of the wide-band video amplifier.

The synchronous demodulator 32 provides restoration of the sense of the energy change. Low-pass filter 34 establishes the average level of the energy change.

The narrow band channel video amplifier 42 has a low cut-off frequency approximately an octave below the reference oscillator 18 frequency and a high cut-off frequency approximately an octave above the reference oscillator frequency. Again, the synchronous demodulator 44 provides restoration of the sense of the energy change in the signal while the low-pass filter 46 establishes the average level of the energy change.

In operation, if the transmission is of a continuous wave nature, both amplifiers i.e., the wide-band amplifier 30 and narrow-band amplifier 42, will produce average level changes at the output of the low-pass filters 34 and 46, respectively. These levels are applied to comparators 36 and 48, each of which in turn will produce an output if the level from the associated low-pass filter 34 and 46, respectively, exceeds the threshold voltage established by the threshold voltage level setting circuit 38 or 50, respectively. Each comparator output is supplied to the CW "and" gate 52. If both comparator outputs appear at the input to the CW "and" gate, the gate 52 produces an output and an indication of CW transmission having been received at antenna 10. The output of the CW comparator 48 is applied to the inverter 54 which inhibits the output of the pulse "and" gate 40 if an output from the CW comparator 48 exists.

If the received transmission is of a pulsed nature, the narrow-band channel 28 video amplifier 42 will not pass the pulse and there will be no change in the level of the signal from the low-pass filter 46. The CW comparator 48, in turn, will not provide an output to the CW "and" gate 52. However, the wide-band video amplifier 30 in wide-band channel 26 will pass the pulse and the resultant level change from the low-pass filter 34 will produce an output at the output of the pulse comparator 36 which will be coupled as an input to the pulse "and" gate 40. The CW inverter 54 will have no effect upon the pulse "and" gate at this point and the pulse "and" gate 40 will produce an output indicative of a pulse transmission having been received at the antenna 10.

The only limitation on the reference oscillator 18 is that it be compatible with the system requirements, the limiting factor will be the highest frequency of operation of the RF switch 12. The switch frequency should be chosen such that it will provide adequate sampling. Frequencies of several KHz are recommended. Also, the switch frequency should be chosen such that the narrow-band amplifier band pass is not capable of passing the widest pulse expected.

The low-pass filter band-pass is dependent upon the system capability for observation of the source of energy and may typically be any upper cut-off between 1 and 1000 Hz.

Phase shifter 20 is used to adjust out any phase lag caused by the switch 12, RF amplifier 14 or video amplifier in the respective channel so that the synchronous demodulators operate in phase.

As alternatives, the narrow-band amplifier 42 might be of the variable band pass-type and the reference oscillator 18 may be of the variable frequency type and the frequency adjustment could be coupled to the narrow-band amplifier center frequencies. In addition, the phase shifter 20 could be placed in line between the reference oscillator 18 and the synchronous demodulators 32 and 44. More than one phase shifter might be used, if desired. The "and" gates 40 and 52 and their operation could be changed by using equivalent Nand gates.

An advantage of the present invention is that a single radio frequency amplifier can be used to detect and discriminate between pulse and CW transmission.

What is claimed is:

1. A radiometer circuit for determining the character of the modulation of a received signal comprising:
   antenna means adapted to receive a signal and having an output;
   a reference termination;
   switching mans having multiple inputs and at least one output;
   one of said multiple inputs to said switching means being operatively connected to said antenna means;
   another of said multiple inputs to said switching means being operatively coupled to said reference termination;
   detector means having an input operatively coupled to said at least one output of said switching means for detecting a differential energy level and having an output;
   oscillator means having multiple outputs one of which is operatively coupled to one of said multiple inputs to said switching means to cause said switching means to commutate the input of said detector means between said antenna means and said reference termination;
   wide-band and narrow-band radiometry channels operatively connected to the output of said detector means and each having an output;
   said narrow-band channel being operative differentiate pulse signals from continuous wave signals;
   continuous wave determining means having inputs operatively coupled to the output of each said narrow-band channel and wide-band channel and having an output therefrom corresponding to an indication of continuous wave modulation when the output from each of said broadband and narrow-band channels are present simultaneously at the input thereto and having another output corresponding to an inverted output;
   pulse determining means having inputs operatively coupled to the output of said broadband channel and said another output from said continuous wave determining means and having an output corresponding to an indication of pulse modulation when the output from said broadband channel and said inverted output are present simultaneously at the input thereto.

2. A radiometer circuit as set forth in claim 1 wherein: said wide-band channel includes:
   a wide-band amplifier having an input operatively coupled to the output of said detector means and having an output therefrom;
   demodulator means having an input operatively receiving the output of said wide-band amplifier means for demodulating the signal received and in turn having an output;
   low-pass filter means having an input operatively receiving the output of said demodulator means and in turn having an output therefrom; said filter means establishing the average level of the energy change in the signal; and
   pulse comparator mean shaving an input operatively coupled to the output of said low-pass filter means and in turn having an output which corresponds to one input to said pulse determining means.

3. A radiometer circuit as set forth in claim 2 wherein:
said demodulator means has another input; and
one of said multiple outputs from said oscillator means being connected to said another input to the demodulator means.

4. A radiometer circuit as set forth in claim 2 and further including:
voltage level setting means having an output;
said pulse comparator means in said wide-band channel having another input thereto;
the other input thereto being the output of said voltage setting means.

5. A radiometer circuit for determining the character of modulation of a received signal as set forth in claim 1 wherein;
said narrow-band channel includes;
a narrow-band amplifier having an input operatively connected to the output of said detector means and in turn having an output;
demodulator means having an input operatively receiving the output of said narrow-band amplifier for restoring the sense of the energy change in a received signal and in turn having an output therefrom;
low-pass filter means having an input operatively connected to the output of the demodulator means for establishing the average level of the energy change in the signal and in turn having an output therefrom; and
continuous wave comparator means having an input coupled to the output of said low-pass filter means and in turn having an output connected as one input to the continuous wave determining means.

6. A radiometer circuit as set forth in claims 2 or 5 wherein;
the demodulators in the wide-band and narrow-band channels are synchronous demodulators.

7. A radiometer circuit as set forth in claim 5 wherein:
said demodulator in said narrow-band channel has another input; and
one of the multiple outputs from said oscillator means being connected to said another input to the demodulator in said narrow-band channel.

8. A radiometer circuit as set forth in claim 6 wherein;
each of said synchronous demodulators in the respective wide-band and narrow-band channels has another input thereto; and
wherein one of said multiple outputs from said oscillator means are connected to said another of the input to each of the synchronous demodulator means.

9. A radiometer circuit as set forth in claim 5 and further including:
another voltage level setting means having an output;
said CW comparator means in said narrow-band channel having another input corresponding to the output of said voltage level setting means.

10. A radiometer circuit as set forth in claim 1 and further including:
phase shifter means operatively connected between the output of said oscillator means and an input to said switching means.

* * * * *